(12) United States Patent
Abraham et al.

(10) Patent No.: US 9,389,986 B2
(45) Date of Patent: Jul. 12, 2016

(54) IDENTIFYING IMPACTED TESTS FROM STATICALLY COLLECTED DATA

(71) Applicant: Microsoft Corporation, Redmond, WA (US)

(72) Inventors: Arun Mathew Abraham, Redmond, WA (US); Haiying Xu, Redmond, WA (US); Jun Su, Redmond, WA (US); Peter Gerard Provost, Denver, CO (US); Jing Fan, Redmond, WA (US); Jean-Marc Prieur, Ollioules (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/887,384

(22) Filed: May 6, 2013

(65) Prior Publication Data

US 2014/0331206 A1      Nov. 6, 2014

(51) Int. Cl.
    *G06F 9/44*      (2006.01)
    *G06F 11/36*      (2006.01)

(52) U.S. Cl.
    CPC ........ *G06F 11/3676* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 6,002,869 A | | 12/1999 | Hinckley |
| 7,028,290 B2* | 4/2006 | Srivastava | ........... G06F 11/3676 717/127 |
| 7,055,136 B2* | 5/2006 | Dzoba | ................... G06F 11/362 717/124 |
| 7,210,126 B2* | 4/2007 | Ghobrial et al. | .............. 717/127 |
| 7,506,320 B2* | 3/2009 | Bhandari | .................. G06F 8/74 717/127 |
| 7,620,941 B1* | 11/2009 | Leventhal | ...................... 717/126 |
| 7,665,071 B1* | 2/2010 | Roles et al. | .................... 717/124 |
| 7,861,226 B1* | 12/2010 | Episkopos et al. | ............ 717/124 |
| 7,958,486 B2* | 6/2011 | Tsyganskiy | ............... G06F 8/72 717/127 |
| 8,146,058 B2* | 3/2012 | Sarkar | ....................... G06F 8/10 717/124 |
| 8,219,980 B2* | 7/2012 | Bates et al. | .................... 717/126 |
| 8,276,123 B1* | 9/2012 | Deng | .................... G06F 11/368 717/126 |
| 8,286,143 B2* | 10/2012 | Garimella | ........... G06F 11/3612 717/127 |
| 8,332,817 B2* | 12/2012 | Li | ....................... G06F 11/3604 717/124 |

(Continued)

FOREIGN PATENT DOCUMENTS

EP      2333669 A1      6/2011

OTHER PUBLICATIONS

Lee, "Change Impact Analysis of Object-Oriented Software"; 1998, George Mason University; [retrieved on Oct. 23, 2014]; Retrieved from Internet<URL:http://cs.gmu.edu/~offutt/rsrch/LiLiDiss.pdf>;pp. 1-193.*

(Continued)

*Primary Examiner* — Xi D Chen

(74) *Attorney, Agent, or Firm* — Kevin Sullivan; Kate Drakos; Micky Minhas

(57) ABSTRACT

The present invention extends to methods, systems, and computer program products for identifying impacted tests from statically collected data. In general, static dependency data, possibly augmented with some dynamic data, is used to find an appropriate set of impacted tests for code changes. In some embodiments, static dependency analysis is used to identify tests impacted by a code change. Heuristics can be used to assist with identifying an appropriate set of impacted tests to run for a code change. Dynamic data can be used to augment static dependency data to identify more optimal sets of impacted tests to run for a code change.

20 Claims, 8 Drawing Sheets

(56) References Cited

U.S. PATENT DOCUMENTS

| | | | | |
|---|---|---|---|---|
| 8,332,827 | B2* | 12/2012 | Edde | G06F 9/4428 717/127 |
| 8,489,474 | B2* | 7/2013 | Crook | G06Q 10/04 717/126 |
| 8,527,956 | B2* | 9/2013 | Bell et al. | 717/127 |
| 8,543,991 | B2* | 9/2013 | Ramaswamy et al. | 717/127 |
| 8,544,016 | B2* | 9/2013 | Friedman et al. | 718/104 |
| 8,584,100 | B2* | 11/2013 | Xu | G06F 11/368 717/126 |
| 8,627,287 | B2* | 1/2014 | Fanning et al. | 717/126 |
| 8,677,325 | B2* | 3/2014 | Batthish | G06F 8/20 717/127 |
| 8,739,128 | B1* | 5/2014 | Cohen | G06F 11/3672 717/126 |
| 8,813,056 | B2* | 8/2014 | Buchard et al. | 717/127 |
| 8,819,642 | B2* | 8/2014 | Bhat | G06F 11/3684 717/127 |
| 8,826,239 | B2* | 9/2014 | Sawano | 717/126 |
| 8,843,901 | B2* | 9/2014 | Krajec et al. | 717/126 |
| 8,887,138 | B2* | 11/2014 | Eker et al. | 717/127 |
| 8,924,941 | B2* | 12/2014 | Krajec et al. | 717/126 |
| 8,966,438 | B2* | 2/2015 | Chamberlain | 717/124 |
| 9,026,997 | B2* | 5/2015 | Gangadharappa | G06F 8/00 717/124 |
| 9,032,370 | B2* | 5/2015 | Chakraborty | G06F 11/3672 717/124 |
| 2002/0066077 | A1* | 5/2002 | Leung | G06F 11/368 717/127 |
| 2003/0023856 | A1 | 1/2003 | Horne et al. | |
| 2003/0212661 | A1* | 11/2003 | Avvari et al. | 707/2 |
| 2004/0064806 | A1* | 4/2004 | Johnston-Watt | G06F 11/3466 717/124 |
| 2004/0181710 | A1* | 9/2004 | Sauer et al. | 717/124 |
| 2005/0235270 | A1* | 10/2005 | Sanyal | 717/136 |
| 2006/0168565 | A1* | 7/2006 | Gamma et al. | 717/122 |
| 2007/0038977 | A1 | 2/2007 | Savage | |
| 2008/0104570 | A1* | 5/2008 | Chedgey et al. | 717/105 |
| 2008/0155508 | A1* | 6/2008 | Sarkar | G06F 8/10 717/126 |
| 2009/0089745 | A1 | 4/2009 | Johnson et al. | |
| 2009/0125891 | A1 | 5/2009 | Garimella et al. | |
| 2010/0023926 | A1* | 1/2010 | Sugawara et al. | 717/120 |
| 2010/0198799 | A1 | 8/2010 | Krishnan et al. | |
| 2011/0145788 | A1* | 6/2011 | Xu | G06F 11/368 717/126 |
| 2011/0258421 | A1* | 10/2011 | Elnozahy et al. | 717/124 |
| 2012/0159420 | A1 | 6/2012 | Yassin et al. | |
| 2012/0192153 | A1 | 7/2012 | Venkatraman et al. | |
| 2013/0305224 | A1* | 11/2013 | Eade | G06F 8/20 717/126 |
| 2014/0130020 | A1* | 5/2014 | Boshernitsan et al. | 717/131 |
| 2014/0229923 | A1* | 8/2014 | Sennewald | G06F 11/3692 717/127 |
| 2014/0282421 | A1* | 9/2014 | Jubran | G06F 11/3672 717/126 |
| 2014/0331206 | A1* | 11/2014 | Abraham | G06F 11/3676 717/124 |
| 2015/0186250 | A1* | 7/2015 | Friedler | G06F 11/3672 717/124 |
| 2015/0186251 | A1* | 7/2015 | Friedler | G06F 11/3672 717/124 |
| 2015/0261653 | A1* | 9/2015 | Lachambre | G06F 11/3616 717/126 |

OTHER PUBLICATIONS

Apiwattanapong, et al., "Efficient and Precise Dynamic Impact Analysis Using Execute-After Sequences"; 2005 ACM;[retrieved on Oct. 23, 2014]; Retrieved from Internet<URL:http://dl.adm.org/citation.cfm?id=1062534>;pp. 432-441.*

Holmes, Notkin, "Identifying Program, Test, and Environmental Changes that Affect Behaviour"; 2011 ACM; [retrieved on Oct. 23, 2014]; Retrieved from Internet<URL:http://dl.acm.org/citation.cfm?id=1985844>;pp. 371-380.*

Rungta, et al., "A Change Impact Analysis to Characterize Evolving Program Behaviors"; 2012 IEEE; [retrieved on Oct. 24, 2014]; Retrieved from Internet<URL:http://ieeexplore.ieee.org/stamp/stamp.jsp?tp=&arnumber=6405261>;pp. 109-118.*

Zhang, et al., "An Empirical Study on Factors Impacting Bug Fixing Time"; 2012, IEEE; <retrieved on Apr. 25, 2015>; Retrieved from Internet <URL:http://ieeexplore.ieee.org/stamp/stamp.jsp?tp=&arnumber=6385118>;pp. 225-234.*

Shao, et al., "Semantic Impact and Faults in Source Code Changes an Empirical Study"; 2009 IEEE; <retrieved on Apr. 25, 2015>; Retrieved from Internet <URL:http://ieeexplore.ieee.org/stamp/stamp.jsp?tp=&arnumber=5076635>;pp. 131-141.*

Gethers, et al., NPL_Gethers(Integrated Impact Analysis for Managing Software Changes; 2012, IEEE; <retrieved on Apr. 25, 2015>; Retrieved from Internet <URL:http://dl.acm.org/citation.cfm?id=2337223.2337274>;pp. 430-440.*

Palepu, Jones, "Discriminating Influences among Instructions in a Dynamic Slice"; 2014 ACM; <retrieved on Apr. 25, 2015>; Retrieved from Internet <URL:http://dl.acm.org/citation.cfm?id=2642937.2642962>;pp. 37-52.*

Nguyen, et al., "Exploring Variability-Aware Execution for Testing Plugin-Based Web Applications"; 2014 ACM; [retrieved on Sep. 9, 2015]; Retrieved from Internet <URL:http://dl.acm.org/citation.cfm?id=2568225.2568300>;pp. 907-918.*

Srinivas, et al., "An Application Synopsis tool for Database Applications developed using Oracle Application Express"; 2010 ACM; [retrieved on Sep. 9, 2015]; Retrieved from Internet <URL:http://dl.acm.org/citation.cfm?id=1730874.1730896>;pp. 113-118.*

Ziftei, Kruger, "Feature Location Using Data Mining on Existing Test-Cases"; 2012; 19th Working Conference on Reverse Engineering;[retrieved on Sep. 9, 2015]; Retrieved from Internet <URL:http://ieeexplore.ieee.org/stamp/stamp.jsp?tp=&arnumber=6385111>;pp. 153-162.*

Etsion, Feitelson, "Exploiting Core Working Sets to Filter the L1 Cache with Random Sampling"; 2012 IEEE;[retrieved on Sep. 9, 2015]; Retrieved from Internet <URL:http://ieeexplore.ieee.org/stamp/stamp.jsp?tp=&arnumber=6035687>;pp. 1535-1550.*

Janjua, "OnSpot System: Test Impact Visibility during Code Edits in Real Software"; 2015 ACM; [retrieved on Mar. 22, 2016]; Retrieved from Internet <URL: http://dl.acm.org/citation.cfm?id=2804430>;pp. 994-997.*

Zheng, et al., "Pallino Automation to Support Regression Test Selection for CoTS-based Applications"; 2007 ACM; [retrieved on Mar. 22, 2016]; Retrieved from Internet <URL: http://dl.acm.org/citation.cfm?id=1321665>;pp. 224-233.*

Peralta, Mukhopadhyay, "Code-Change Impact Analysis Using Counterfactuals"; 2011 IEEE; [retrieved on Mar. 22, 2016]; Retrieved from Internet <URL: http://ieeexplore.ieee.org/stamp/stamp.jsp?tp=&arnumber=6032420>;pp. 694-699.*

Qu, et al., Configuration Selection Using Code Change Impact Analysis for Regression Testing; 2012 IEEE; [retrieved on Mar. 22, 2016]; Retrieved from Internet <URL: http://ieeexplore.ieee.org/stamp/stamp.jsp?tp=&arnumber=6032420>;pp. 129-138.*

"Coverity" Retrieved at<<http://www.coverity.com/products/coverity-save.html>>, Retrieved Date: Jan. 17, 2013, p. 4.

International Search Report & Written Opinion for PCT Patent Application No. PCT/US2014/036722, Mailed Date: Aug. 4, 2014, Filed Date: May 5, 2014, 11 Pages.

Gao, et al., "A Systematic Regression Testing Method and Tool for Software Components", in 30th Annual International Computer Software and Applications Conference, Sep. 1, 2006, vol. 1, pp. 455-466.

Sneed, H.M., "Reverse Engineering of Test Cases for Selective Regression Testing, in Eighth European Conference on Software Maintenance and Reengineering", Mar. 24, 2004, pp. 69-74.

Second Written Opinion Issued in PCT Patent Application No. PCT/US2014/036722, Mailed Date: Jun. 11, 2015, 5 Pages.

International Preliminary Report on Patentability Received in PCT Patent Application No. PCT/US2014/036722 Mailed Date: Sep. 15, 2015, 8 Pages.

* cited by examiner

```
public class Product
{
    public void DoSomething()  ⌐501
    {                          ⎫
        this.GetType().InvokeMember("DoDynamicLoading", BindingFlags.Static |     ⎬ String 504
BindingFlags.InvokeMethod | BindingFlags.Public, Type.DefaultBinder, null, new object[] { }); ⎭
    }
    public static void DoDynamicLoading()  ⌐502
    {
        // Operations here
    }
}

[TestClass]
public class UnitTests
{
    [TestMethod]
    public void Test1()  ⌐503
    {
        Product product = new Product();
        product.DoSomething();
    }
}
```

Fig. 5

```
public class Product
{
    public void DoSomething(bool condition)     —701
    {
        if (condition) —707
        {
            DoThing1();  —708
        }
        else —709
        {
            DoThing2();  —711
        }
    } private void DoThing1()  —702
    {
        // Operations here
    } private void DoThing2()  —703
    {
        // Operations here
    }
}

[TestClass]
public class UnitTests
{
    [TestMethod]
    public void Test1()  —704
    {
        Product product = new Product();
        product.DoSomething(true);  —706
    }
}
```

IDENTIFYING IMPACTED TESTS FROM STATICALLY COLLECTED DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Typically, both software and hardware computer related components are tested before being released to the public. Depending on the type of component, a component can be subject to a variety of different tests to help insure that is operates as intended. Tests can also reveal component deficiencies, which are much cheaper and easier to correct prior to release.

When testing software, tests can include submitting various types of input to the software to determine how the software responds. Even after software is released, testing can continue as further changes are made to the software (e.g., updates, patches, etc.). In some embodiments, large sets of tests are created to test as many possible scenarios are possible. This is beneficial prior to release since every aspect of the software may need to be tested.

However, it is very inconvenient for developers to run all tests with every change that is made. On the other hand, when changes to existing software are made, it may be desirable to target testing to the code where the changes were made. As such, a developer typically selects a subset of tests to run based on their understanding of the change and the test bed. Alternately, the developer may initiate running an entire set of tests. The developer can allow the tests to run for some amount of time to get feedback about the change, potentially stopping the tests after the feedback is received. Unfortunately, these approaches result in either too little or too many tests being run for the change made.

As such, some testing techniques attempt to identify a subset of relevant tests in a more automated fashion. For example, testing techniques can use dynamic data from prior test runs. However, using dynamic data requires test runs to be instrumented or sampled, resulting in (potentially significantly) slower runs. Many developers are unwilling to deal with these delays for every test run since it slows down the feedback loop. Further, the total time associated with these delays can add up over the course of development.

BRIEF SUMMARY

The present invention extends to methods, systems, and computer program products for identifying impacted tests from statically collected data. In response to a portion of code being changed, dependency data for the portion of code is accessed. The portion of code is to be tested to determine if a product containing the code is left in an appropriate state after the portion of code is executed. Static dependency analysis is performed to identify one or more tests, from among a plurality of tests, which are impacted by the change to the code. For each test in the plurality of tests, the transitive closure of the outward dependency links originating from the test are traversed. Optionally, one or more other techniques, such as, for example, more advanced static analysis, heuristics, dynamic data, etc., can be used to alter the transitive closure. The reverse mapping of the (possibly altered) transitive closure of the outward dependency links is used to infer whether the change to the code potentially impacts the test. The one or more tests are included in a set of tests for use in testing the product.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates an example code sample including dynamic invocation of a method.

DETAILED DESCRIPTION

Figure 1:
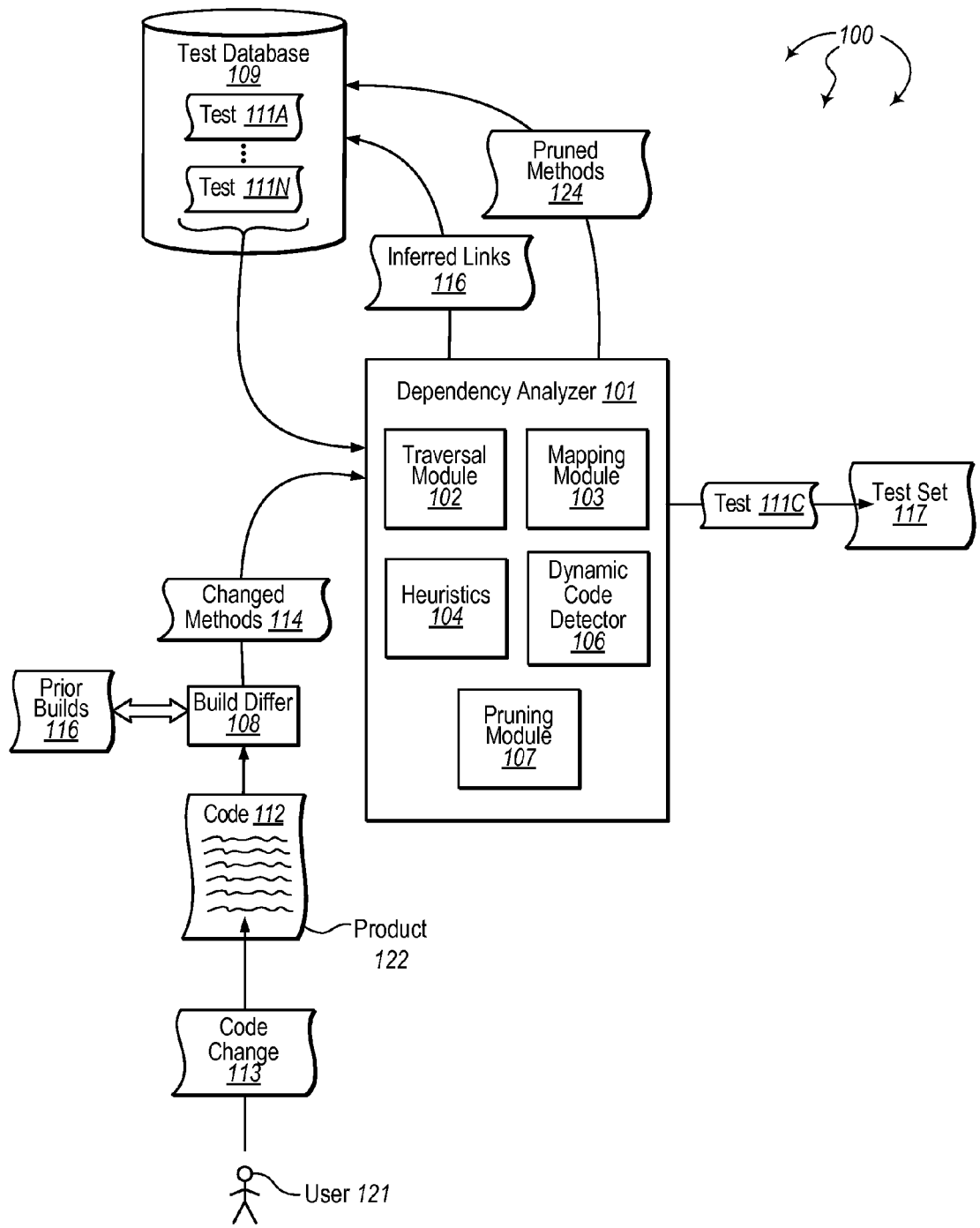
FIG. 1 illustrates an example computer architecture that facilitates identifying impacted tests from statically collected data.

The present invention extends to methods, systems, and computer program products for identifying impacted tests from statically collected data. In response to a portion of code being changed, dependency data for the portion of code is accessed. The portion of code is to be tested to determine if a product containing the code is left in an appropriate state after the portion of code is executed. Static dependency analysis is performed to identify one or more tests, from among a plurality of tests, which are impacted by the change to the code. For each test in the plurality of tests, the transitive closure of the outward dependency links originating from the test are traversed. Optionally, one or more other techniques, such as, for example, more advanced static analysis, heuristics, dynamic data, etc., can be used to alter the transitive closure. The reverse mapping of the (possibly altered) transitive closure of the outward dependency links is used to infer whether the change to the code potentially impacts the test. The one or more tests are included in a set of tests for use in testing the product.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Hardwired connections can include, but are not limited to, wires with metallic conductors and/or optical fibers. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In general, static dependency data, possibly augmented with some dynamic data, is used to find an appropriate set of impacted tests for code changes. In some embodiments, static dependency analysis is used to identify tests impacted by a code change. Heuristics can be used to assist with identifying an appropriate set of impacted tests to run for a code change. Dynamic data can be used to augment static dependency data to identify more optimal sets of impacted tests to run for a code change.

FIG. 1 illustrates an example computer architecture 100 that facilitates identifying impacted tests from statically collected data. Referring to FIG. 1, computer architecture 100 includes dependency analyzer 101, build differ 108, and test database 109. Each of includes dependency analyzer 101, build differ 108, and test database 109 can be connected to one another over (or be part of) a network, such as, for example, a Local Area Network ("LAN"), a Wide Area Network ("WAN"), and even the Internet. Accordingly, dependency analyzer 101, build differ 108, and test database 109 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

In general, dependency analyzer 101 is configured to determine which methods potentially impact a test. As depicted, dependency analyzer 101 includes traversal module 102, mapping module 103, heuristics 104, dynamic code detector 106, and pruning module 107.

Methods potentially impacting a test can be determined through static analysis. Traversal module 102 is configured to traverse the transitive closure of outward dependency links originating from a test method. Mapping module 103 is configured to reverse map traversed methods to the test method. For example, considering:

TestMethod1--calls→Method1--calls→Method2--calls→Method3, traversal module 102 can traverse the calls to infer that TestMethod1 is potentially impacted by the set of {Method1, Method2, Method3}. Mapping module 103 can generate a reverse mapping that indicates a change to any of Method3, Method 2, or Method 1 impacts TestMethod1. The reverse mapping can be used to identify and run relevant tests (e.g., from among tests stored in test database 109). That is, if TestMethod1 potentially hits (i.e., has an outward dependency to) Method1, then Method1 can potentially be called by TestMethod1. Thus, the reverse mapping, further indicates that a change in Method1 can impact TestMethod1

That is, if TestMethod1 potentially hits (i.e., has an outward dependency to) Method1, then Method1 can potentially be called by TestMethod1. As such, the reverse mapping further indicates that a change in Method1 can impact TestMethod1. Since Method1 can potentially hit Method2 and Method 2 can potentially hit Method 3, the respect mapping also further indicates that a change in Method2 or Method2 can impact TestMethod1.

Heuristics 104 are configured to make more intelligent decisions with respect to methods that potentially impact a test. For example, the use of virtual methods and interface implementations can obscure whether a method potentially impacts a test. As such, heuristics 104 can be configured to determine that when a test calls an interface or virtual method, that it is ok to include all implementing virtual methods in derived classes or the interface methods in all concrete instances of the interface as methods that potentially impact the test.

Dependency analyzer 101 can execute tests that target product 122. During execution of product 122, dynamic code detector 106 and/or pruning module 107 can collect dynamic data about how the tests exercise product 122. The collected dynamic data can be used to dynamic analysis.

During runtime, dynamic code detector 106 is configured to infer links between methods due to dynamic code invocation (e.g., reflection, LoadLibrary, dependency injection, etc.). Inferred links can be links in dynamic data that are not in static data. Inferred links can be persisted in test database 109. Subsequent analyses can use inferred links when determining dependency data. Also during runtime, pruning module 107 is configured to prune out methods that are not actually called by a test at runtime. An indication of pruned out methods can be stored in test database 109. Subsequent analyses can use the indications of pruned out methods when determining dependency data.

Accordingly, in some embodiments, dynamic data can be used to augment dependency data determined through static analysis. Dynamic data can be retained in test database 109 until another dynamic run is performed or something changes along a code flow path. Augmenting dependency data with dynamic data facilitates more precise selection of a set of tests to run for a code change.

Test database 109 is configured to store tests for testing code 112. Tests 111A-111N are stored in test database 109. Dependency analyzer 101 can analyze changed methods (in code 112) to identify tests, from among test 111A-111N, that are potentially impacted by the changed methods. Dependency analyzer 101 can include the identified tests in appropriate test sets. Code 112 can be source code or binary files, such as, for example, dynamic link libraries (DLLs) and executables.

Build differ 108 is configured to identify changed methods resulting from a code change. Builder differ 108 can compare changed code to prior builds of the code to identify changed methods. Build differ 108 can also compare user types within code.

Figure 2:
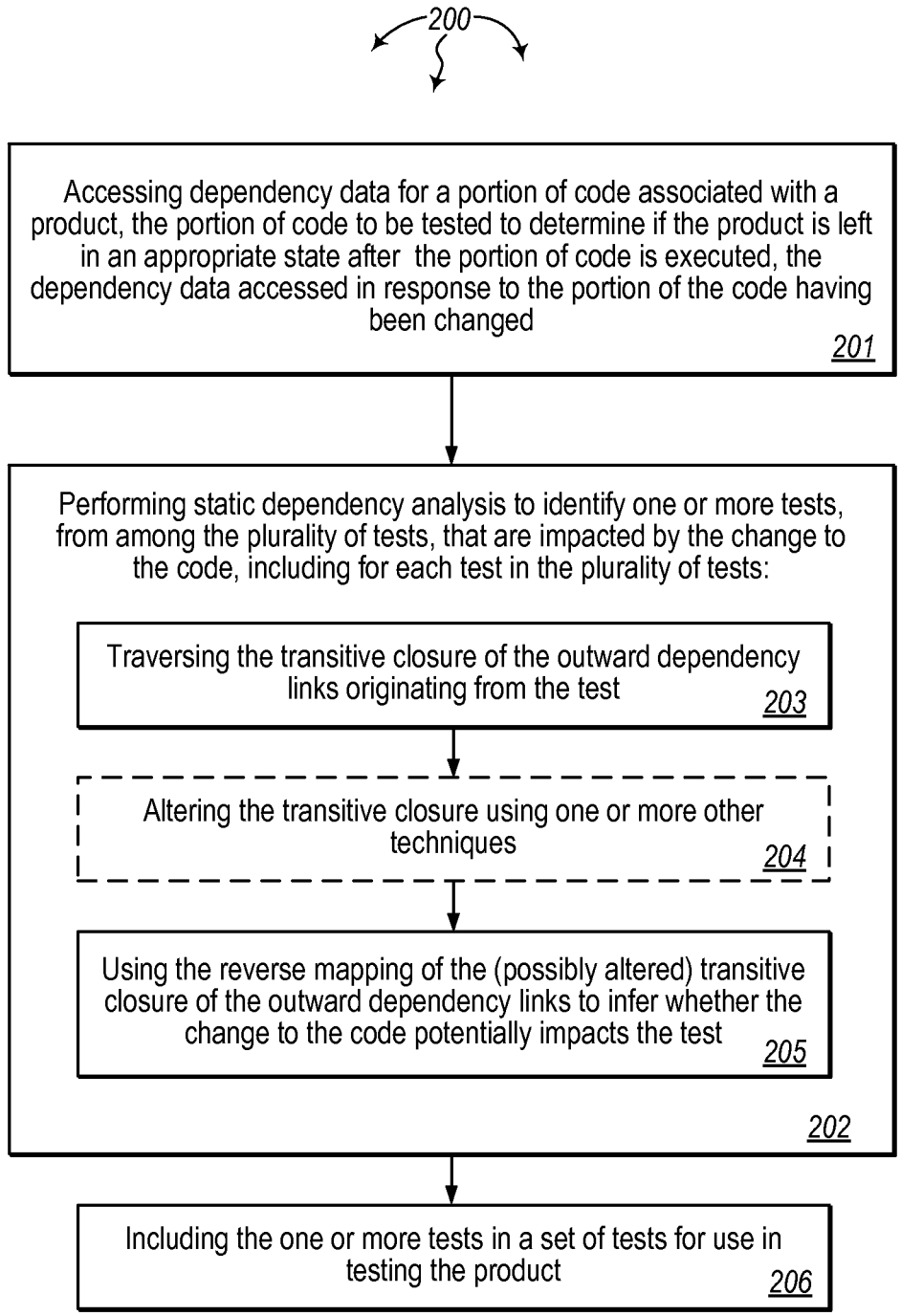
FIG. 2 illustrates a flow chart of an example method for identifying impacted tests from statically collected data.

FIG. 2 illustrates a flow chart of an example method 200 for identifying impacted tests from statically collected data. Method 200 will be described with respect to the components and data of computer architecture 100.

User 121 can make code change 113 to code 112. Build differ 108 can compare code 112, with code change 113, to one or more of prior builds 119. From the comparison, build differ 108 can identify changed methods 114. Code 112 can be a portion of a product 122. Product 122 can be a software product, such as, for example, a word processing product, a spreadsheet management product, an accounting product, an email product, an Internet browsing product, etc.

Method 200 includes accessing dependency data for a portion of code associated with a product, the portion of code to be tested to determine if the product is left in an appropriate state after the portion of code is executed, the dependency data accessed in response to the portion of the code having been changed (201). For example, dependency analyzer 101 can access changed methods 114 for code 112. Changed methods 114 can be tested to determine if product 122 is left in an appropriate after code 112, including changed methods 114, are executed. Changed methods 114 can be accessed in response to user 121 making code change 113 to code 112.

Method 200 includes performing static dependency analysis to identify one or more tests, from among the plurality of tests, that are impacted by the change to the code (202). For example, dependency analyzer 101 can perform static dependency analysis to identify that test 111C (included in 111A-111N) is impacted by changed methods 114.

Performing static dependency analysis includes, for each test in the plurality of tests, traversing the transitive closure of the outward dependency links originating from the test (203). For example, for each of tests 111A-111N, traversal module 102 can traverse the transitive closure of outward dependency links originating from the test 111A-111N for any of changed methods 114. Outward dependency links can include calls, references, etc.

Performing static dependency analysis optionally includes (as indicated by the dashed line), for each test in the plurality of tests, altering the transitive closure using one or more other techniques (204). For example, dependency analyzer 101 can alter the transitive closure for test 111A-111N using one or more of: more advanced static analysis, heuristics, dynamic data, etc. In some embodiments, one or more of heuristics 104, dynamic code detector 106, and pruning module 107 alter the transitive closure for a test.

Performing static dependency analysis includes, for each test in the plurality of tests, using the reverse mapping of the (possibly altered) transitive closure of the outward dependency links to infer whether the change to the code potentially impacts the test (205). For example, for each of tests 111A-111N, mapping module 103 can reverse map the transitive closure of dependency links originating from the test 111A-111N. From the reverse map, dependency analyzer 101, can infer whether changed methods 114, as well as other methods called by changed methods 114, potentially impact the test 111A-111N.

A reverse mapping can be maintained as a mapping table in test database 109.

Method 200 includes including the one or more tests in a set of tests for use in testing the product (206). For example, dependency analyzer 101 can include test 111C in test set 117. Test set 117 can contain tests for use in testing product 122.

In some embodiments, heuristics 104 can be used to more precisely identify tests for including in test set 117. For example, heuristics 104 can be used to assist with identifying concrete implementations of interfaces and identifying virtual methods.

Figure 3:
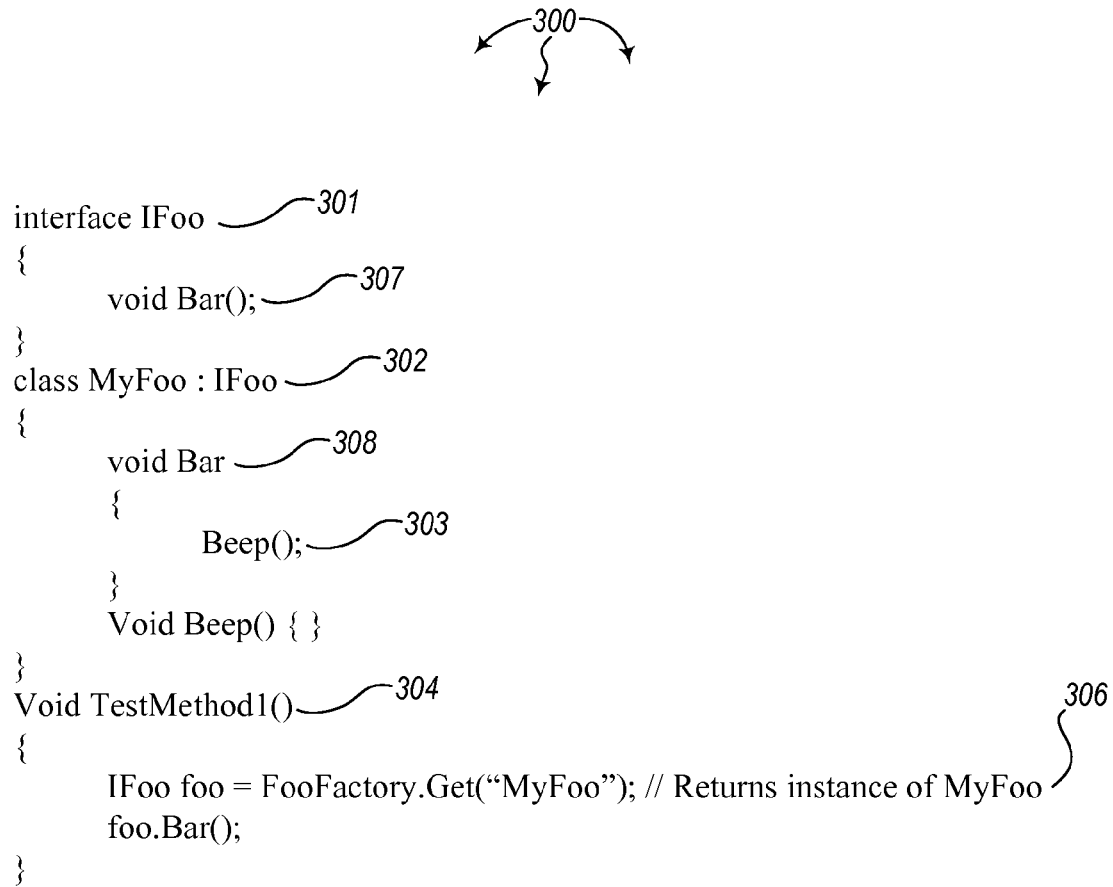
FIG. 3 illustrates an example code sample including an interface.

Turning to FIG. 3, FIG. 3 illustrates an example code sample 300 including an interface. As depicted, interface IFoo is defined at line 301. A class MyFoo of interface type IFoo is defined at line 302. A method MyFoo.Beep is defined at line 303. TestMethod1 is defined at line 304. TestMethod1( ) includes line 305, which returns a concrete instance of MyFoo.

Heuristics 104 can be included as part of a transitive traversal to find impacting methods. Thus for code sample 300, there can be a link from TestMethod1 to {IFoo.Bar( ) MyFoo.Bar( )}, which in turn can result in MyFoo.Beep being found and included in the impacting methods list.

As described, one or both of dynamic code detector 106 and pruning module 107 can be used to augment statically collected data with dynamic data. Dependency analyzer 101 can have dynamic runs (e.g., using code coverage, Intellitrace™, test impact, etc.) and inject that information into the impacted test data. For example, dynamic code detector 106 can infer links between methods called at runtime. Dependency analyzer 101 can store these inferred links as inferredlinks 116 in test database 109. Likewise, pruning module 107 can prune out methods that are not actually called at runtime. Dependency analyzer 101 can store an indication of these pruned out methods as pruned methods 124. Both inferred links and pruned out methods can be used to refine the content of test set 117.

Figure 4:
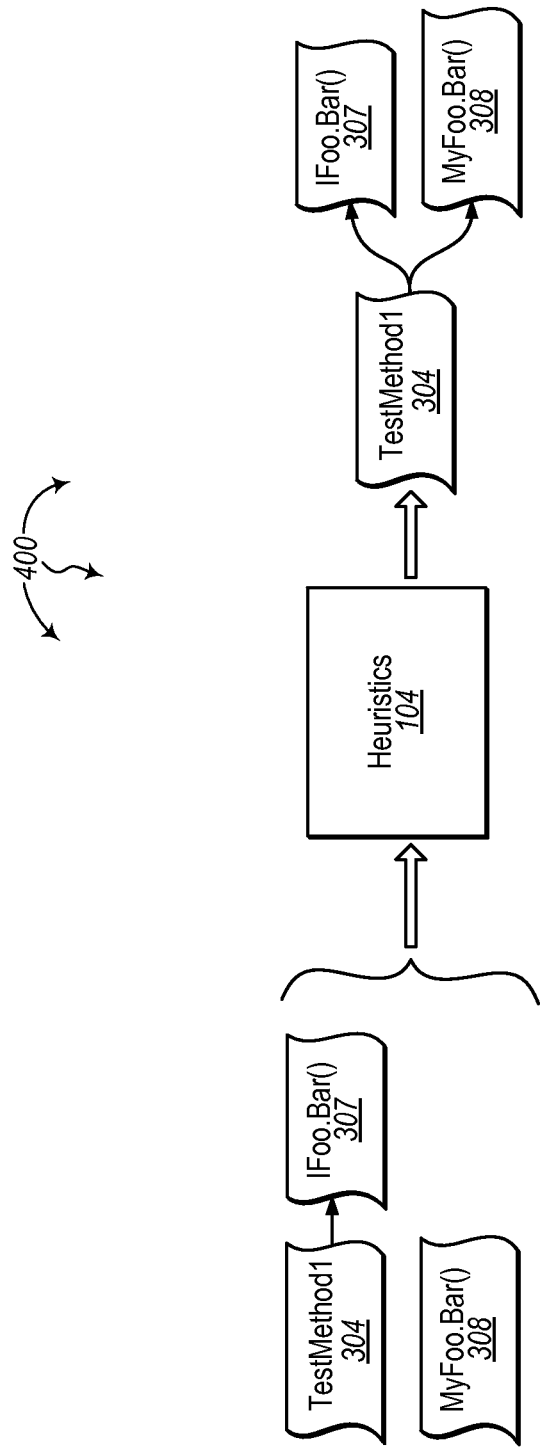
FIG. 4 illustrates an example computer architecture for using heuristics to identify a method that potentially impacts a test.

FIG. 4 illustrates an example computer architecture 400 for using heuristics to identify a method that potentially impacts a test. As depicted, IFoo.Bar( ) 307 potentially impacts test TestMethod1 304 (e.g., as detected through static analysis). A code change can further include changes to MyFoo.Bar( ) 308. Heuristics 104 can determine that MyFoo.Bar( ) 308 also potentially impacts test TestMethod1 304. Accordingly, MyFoo.Bar( ) 308 can be included in the transitive closure for TestMethod1 304.

FIG. 5 illustrates an example code sample 500 including dynamic invocation of a method. Code sample 500 includes Method DoSomething at line 501, Method DoDynamicLoading at line 502, and Method Test1 at line 504. String 504 "DoDynamicLoading" is included in Method DoSomething( ). Dynamic code detector 106 can infer extra links (compared to static data) associated with DoDynamicLoading at runtime. Dynamic code detector 106 can infer a link between the method DoDynamicLoading and Test1. Thus, when DoDynamicLoading is changed, Test1 can be included as a potentially impacted test.

Figure 6:
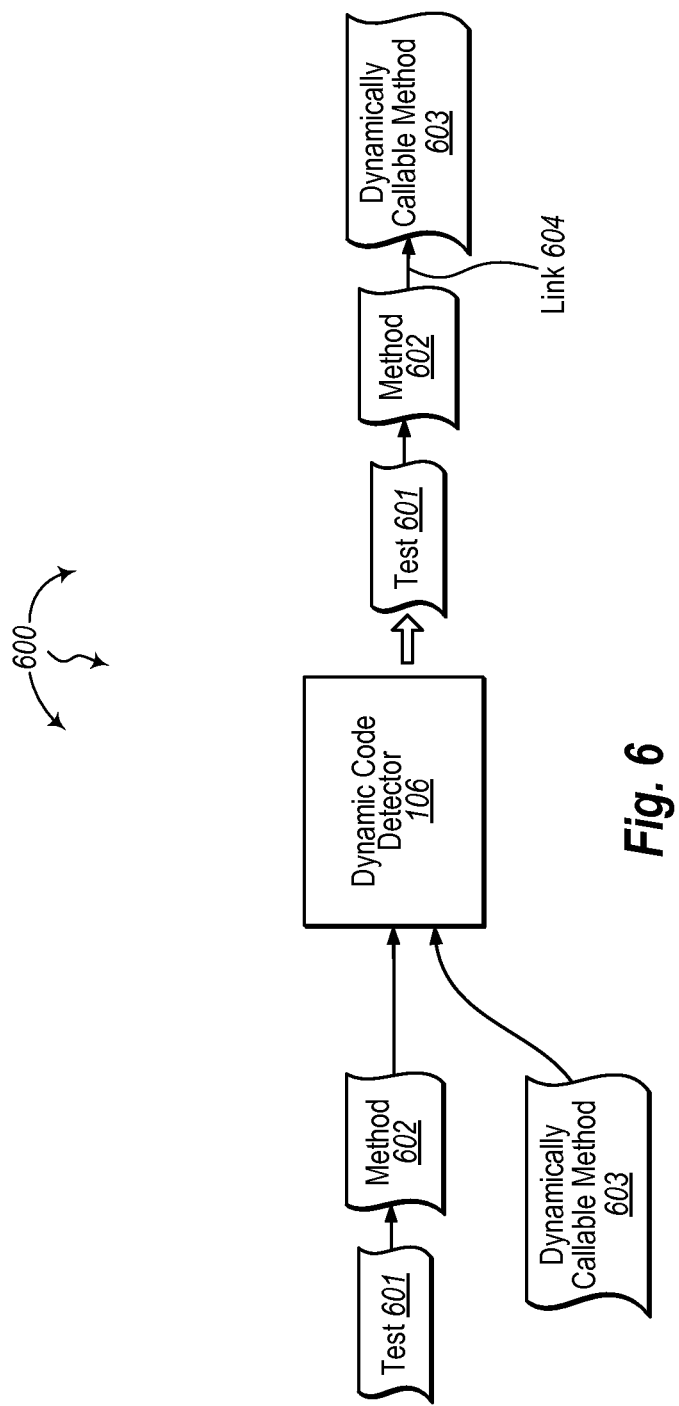
FIG. 6 illustrates an example computer architecture for adding a link to dependency data.

FIG. 6 illustrates an example computer architecture 600 for adding a link to dependency data. As depicted, method 602 potentially impacts test 601 (e.g., as detected through static analysis). A code change can further include changes to dynamically callable method 603. Method 602 can call dynamically callable method 603 at runtime. As such, dynamic code detector 106 can infer a link 604 between method 602 and dynamically callable method 603 at runtime. Link 604 can be used in subsequent analysis to determine that dynamically callable method 603 also potentially impacts test 601. Using link 604, dynamically callable method 603 can be included in the transitive closure for test 601.

Figure 7:
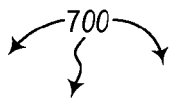
FIG. 7 illustrates an example code sample including a conditional statement.

FIG. 7 illustrates an example code sample 700 including a conditional statement. Code sample 700 includes method DoSomething at line 701, method DoThing1 at line 702, method DoThing2 at line 703, and method Test at line 704. At line 706, Test1 is configured to call DoSomthing with the value of "true". Thus, when Test1 is used, the conditional statement at line 707 is always satisfied and DoThing1 is called at line 708. On the other, the else statement at 709 is never reached and DoThing2 is never called at line 711. Accordingly, changes to DoThing2 do not impact Test1. Pruning module 107 can detect that DoThing2 is never called. Accordingly, pruning module 107 can indicate DoThing2 as a method to be pruned from the transitive closure for Test1. Thus, when DoThing2 is changed, Test1 is not included as a potentially impacted test. Further, DoThing2 is excluded from the transitive closure for test1 704.

Figure 8:
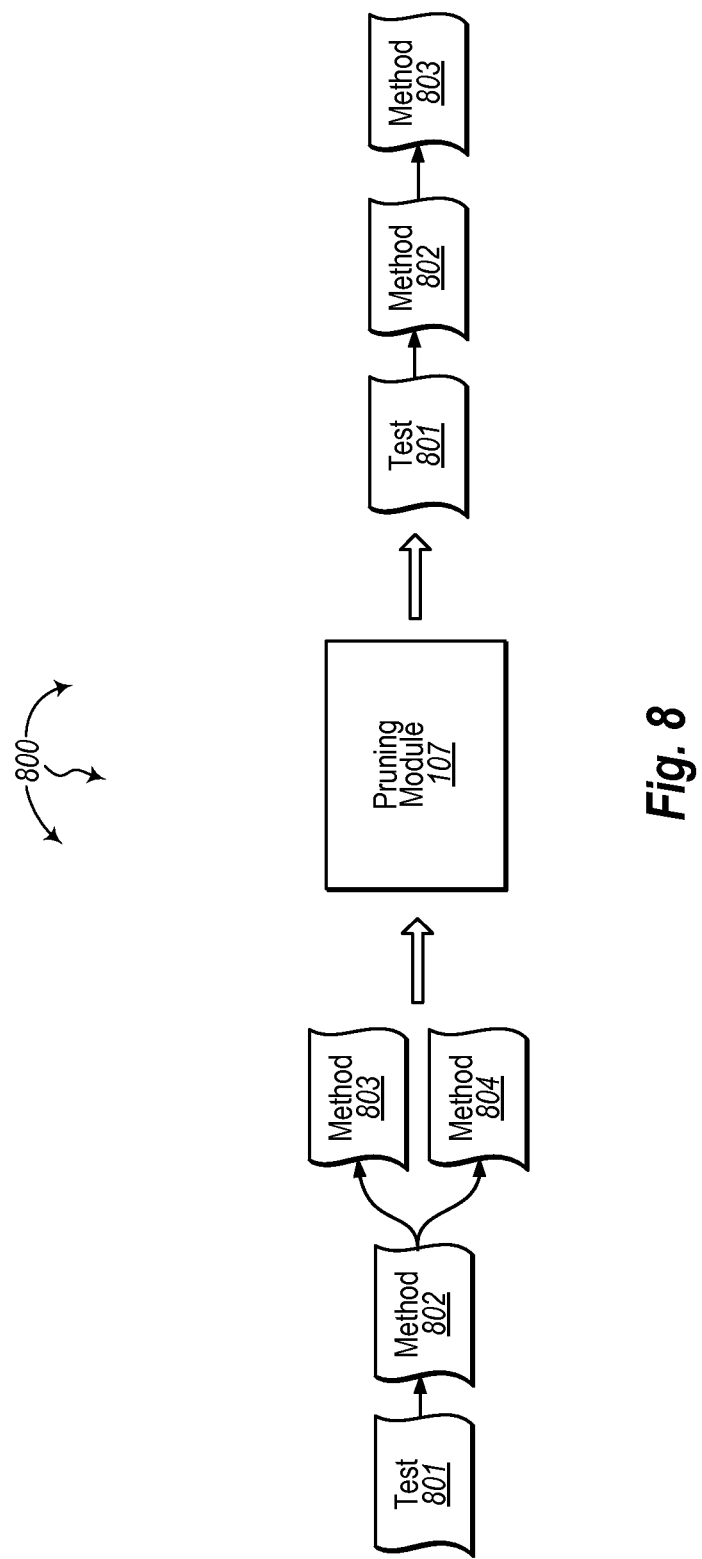
FIG. 8 illustrates an example computer architecture for pruning a method from dependency data.

FIG. 8 illustrates an example computer architecture 800 for pruning a method from dependency data. As depicted, test 801 references method 802. Method 802 in turn references methods 803 and 804. Thus, test 801 is potentially impacted by any of methods 802, 803, and 804. However, pruning module 107 can detect that at runtime method 804 is not called. Thus, pruning module 107 can indicate that method 804 is to be pruned from methods that potentially impact test 801. The indication can be used in subsequent analysis to determine that method 804 does not impact test 801. Using the indication, method 804 can be removed from the transitive closure for test 801.

The collection of dynamic data is configurable to regulate the time and resources expended to collect dynamic data. In some embodiments, dynamic data is collected at specified run intervals, such as, for example, every $10^{th}$ run. In other embodiments, dynamic data is collected for a subset of tests (e.g., 10% of tests) with every run. In this other embodiment, dynamic data is collected incremental without consuming significant resources and/or time. In further embodiments, static dependency analysis is used to detect tests potentially hit by a code change. Dynamic data is collected for the set of tests that are part of the impact run. Thus, dynamic data augmentation is current with the changes by running a smaller subset of test.

Dynamic data can be pre-calculated using an initial baseline. Combining pre-calculation with dynamic data collection for tests potentially hit by a code change helps ensure that expended resources and time are limited to collecting dynamic data for changes. For example, if a developer makes small changes, appropriate dynamic data can be collected with a few dynamic test runs. In some environments, the combination of pre-calculation and dynamic data collection for tests potentially hit by a code change provides an appropriate balance between static and dynamic strategies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, a computer-implemented method for identifying impacted tests from statically collected data, the method comprising:
    performing dependency analysis to identify one or more tests that are impacted by a code change to a portion of code, including for each test in the one or more tests:
        augmenting the transitive closure of the outward dependency links originating from the test with dynamic data for the code change, the dynamic data collected from dynamic runs of the portion of code at specified run intervals, the specified run intervals being less than all of the dynamic runs to regulate the resources expended to collect dynamic data; and
        using the reverse mapping of the augmented transitive closure of the outward dependency links to infer whether the code change potentially impacts the test; and
    indicating the one or more tests for use in testing a product.

2. The method of claim 1, further comprising:
    using a heuristic to determine that the change to the code portion potentially impacts one or more additional tests based on the one or more tests being marked for testing the code portion; and
    marking the additional one or more tests in the test database for use in testing the code portion.

3. The method of claim 2, wherein using a heuristic to determine that the change to the code portion potentially impacts one or more additional tests comprises using a heuristic to determine one or more of:
    a change to an interface potentially impacting one or more tests for testing concrete implementations of the interface; and
    a change to a virtual method potentially impacting one or more tests for testing derived classes of the virtual method.

4. The method of claim 1, further comprising:
    executing the product;
    inferring one or more links to the portion of code from another portion of the code during execution of the product; and
    indicating that a link to the other portion of the code is to be included in subsequent transitive closure traversal calculations.

5. The method of claim 4, wherein inferring one or more links comprises inferring a link from one of: reflection, LoadLibrary, or dependency injection.

6. The method of claim 1, further comprising:
    executing the product;
    detecting that a test, selected from among the one or more tests, is not impacted during execution of the product; and
    pruning the test from the set of tests.

7. The method of claim 1, further comprising pre-calculating dynamic data using an initial baseline for the portion of code; and
    wherein the dynamic data collected from dynamic runs comprises using the initial baseline to limit expended resources used to collect dynamic data from dynamic runs of the code change.

8. The method of claim 1, further comprising accessing dependency data for the portion of code, the portion of code to be tested to determine if the product is left in an appropriate state after the portion of code is executed, the dependency data accessed in response to a code change to the portion of the code.

9. A computer program product for use at a computer system, the computer program product for implementing a method for identifying impacted tests from statically collected data, the computer program product comprising one or more computer memory devices having stored thereon computer-executable instructions that, when executed at a processor, cause the computer system to perform the method, including:
    perform dependency analysis to identify one or more tests that are impacted by a code change to a portion of code, including for each test in the one or more tests:
        augment the transitive closure of the outward dependency links originating from the test with dynamic data for the code change, the dynamic data collected from dynamic runs of the code change at specified run intervals, the specified run intervals being less than all of the dynamic runs to regulate the resources expended to collect dynamic data; and
        use the reverse mapping of the augmented transitive closure of the outward dependency links to infer whether the code change potentially impacts the test; and
    indicate the one or more tests for use in testing a product.

10. The computer program product of claim 9, further comprising computer-executable instructions that, when executed, cause the computer system to:
    use a heuristic to determine that the change to the code portion potentially impacts one or more additional tests based on the one or more tests being marked for testing the code portion; and
    mark the additional one or more tests in the test database for use in testing the code portion.

11. The computer program product of claim 10, wherein computer-executable instructions that, when executed, cause the computer system to use a heuristic to determine that the change to the code portion potentially impacts one or more additional tests comprise computer-executable instructions that, when executed, cause the computer system to use a heuristic to determine one or more of:
    a change to an interface potentially impacting one or more tests for testing concrete implementations of the interface; and
    a change to a virtual method potentially impacting one or more tests for testing derived classes of the virtual method.

12. The computer program product of claim 9, further comprising computer-executable instructions that, when executed, cause the computer system to:

execute the product;
infer one or more links to the portion of code from another portion of the code during execution of the product; and
indicate that a link to the other portion of the code is to be included in subsequent transitive closure traversal calculations.

13. The computer program product of claim 12, wherein computer-executable instructions that, when executed, cause the computer system to infer one or more links comprise computer-executable instructions that, when executed, cause the computer system to infer a link from one of: reflection, LoadLibrary, or dependency injection.

14. The computer program product of claim 9, further comprising computer-executable instructions that, when executed, cause the computer system to:
execute the product;
detect that a test, selected from among the one or more tests, is not impacted during execution of the product; and
prune the test from the set of tests.

15. The computer program product of claim 9, further comprising computer-executable instructions that, when executed, cause the computer system to pre-calculate dynamic data using an initial baseline for the portion of code; and
wherein the dynamic data collected from dynamic runs comprises using the initial baseline to limit expended resources used to collect dynamic data from dynamic runs of the code change.

16. The computer program product of claim 9, further comprising computer-executable instructions that, when executed, cause the computer system to access dependency data for the portion of code, the portion of code to be tested to determine if the product is left in an appropriate state after the portion of code is executed, the dependency data accessed in response to a code change to the portion of the code.

17. A computer system, the computer system comprising:
one or more processors;
system memory;
a test database, the test database storing a plurality of tests for testing a software product;
one or more computer-storage devices having stored thereon computer-executable instructions representing a dependency analyzer for identifying impacted tests for a code change to the product, the dependency analyzer including a traversal module, a mapping module, and a dynamic code detector wherein the traversal module is configured to:
for each of the plurality of tests, traverse the transitive closure of the outward dependency links originating from the test;
wherein the dynamic code detector is configured to:
for each of the plurality of tests, augment the transitive closure of the outward dependency links with dynamic data for the code change, the dynamic data collected from dynamic runs of the code change at specified run intervals, the specified run intervals being less than all of the dynamic runs; and
wherein the mapping module is configured to:
for each of the plurality of tests, using the reverse mapping of the augmented transitive closure of the outward dependency links to infer whether a code change potentially impacts the test.

18. The computer system of claim 17, further comprising a build differ, the build differ configured to:
perform one or more of: compare a code change to prior builds of the product and compare user types within the code change; and
identify changed methods in the code change.

19. The computer system of claim 17, wherein the dependency analyzer is configured to determine if the product is left in an appropriate state after the code change is executed.

20. The computer system of claim 17, wherein the dependency analyzer further includes heuristics and a pruning module, wherein the heuristics are configured to:
refine the plurality of tests to more precisely include tests that are impacted by the code change; and
wherein pruning module is configured to:
detect methods within the code change that are not actually references at runtime; and
add an indication to the test database indicating that the method is a pruned method, the indication for use in subsequent calculations.

* * * * *